(12) United States Patent
Norris et al.

(10) Patent No.: US 11,119,035 B2
(45) Date of Patent: Sep. 14, 2021

(54) SYSTEMS AND METHODS FOR RAPID COATING COMPOSITION DETERMINATIONS

(71) Applicant: PPG Industries Ohio, Inc., Cleveland, OH (US)

(72) Inventors: Alison M. Norris, Avon, OH (US); Paul Beymore, Vermilion, OH (US)

(73) Assignee: PPG Industries Ohio, Inc., Cleveland, OH (US)

(*) Notice: Subject to any disclaimer, the term of this patent is extended or adjusted under 35 U.S.C. 154(b) by 242 days.

(21) Appl. No.: 15/963,567

(22) Filed: Apr. 26, 2018

(65) Prior Publication Data
US 2019/0331591 A1    Oct. 31, 2019

(51) Int. Cl.
| | |
|---|---|
| *G01N 21/27* | (2006.01) |
| *G01J 3/50* | (2006.01) |
| *G01N 21/25* | (2006.01) |
| *G01N 27/60* | (2006.01) |
| *G06N 3/04* | (2006.01) |
| *G06N 3/08* | (2006.01) |

(52) U.S. Cl.
CPC .............. *G01N 21/27* (2013.01); *G01J 3/504* (2013.01); *G01N 21/255* (2013.01); *G01N 27/60* (2013.01); *G06N 3/0445* (2013.01); *G06N 3/0472* (2013.01); *G06N 3/084* (2013.01)

(58) Field of Classification Search
CPC ....... G01J 3/504; G01N 21/255; G01N 21/27; G01N 27/60; G06N 3/0445; G06N 3/0472; G06N 3/084; G06N 7/005

USPC ........................................................ 356/402
See application file for complete search history.

(56) References Cited

U.S. PATENT DOCUMENTS

| | | | |
|---|---|---|---|
| 3,927,944 | A | 12/1975 | Iwahashi |
| 3,972,617 | A | 8/1976 | Shibata |
| 4,092,069 | A | 5/1978 | Fukuda |

(Continued)

FOREIGN PATENT DOCUMENTS

| | | |
|---|---|---|
| CN | 1635957 | 7/2005 |
| CN | 1797420 | 7/2006 |

(Continued)

OTHER PUBLICATIONS

Office Action for U.S. Appl. No. 13/832,554 dated Mar. 26, 2018.

(Continued)

*Primary Examiner* — Sunghee Y Gray
(74) *Attorney, Agent, or Firm* — Workman Nydegger

(57) ABSTRACT

A computer system for identifying coating texture effects initiates a set of colorant decision points. The colorant decision points identify a probability that an effect pigment type is present within a target coating. The computer system calculates in parallel each colorant decision point within the set of colorant decision points. Each colorant decision point provides a probability that a different effect pigment type is present within the target coating. The computer system then calculates a set of final colorant probabilities. Each final colorant probability within the set of final colorant probabilities is calculated by combining a unique subset of probabilities calculated by the first set of colorant decision points. Additionally, each final colorant probability indicates a probability that an associated colorant is present within the target coating.

20 Claims, 6 Drawing Sheets

(56) References Cited

U.S. PATENT DOCUMENTS

| | | | |
|---|---|---|---|
| 4,164,374 A | 8/1979 | Lambe | |
| 4,344,142 A | 8/1982 | Diehr, II | |
| 4,479,718 A | 10/1984 | Alman | |
| 4,544,424 A | 10/1985 | Take | |
| 4,711,580 A | 12/1987 | Venable | |
| 5,231,472 A | 7/1993 | Marcus | |
| 5,319,437 A | 6/1994 | Van Aken | |
| 5,590,251 A | 12/1996 | Takagi | |
| 5,612,928 A | 3/1997 | Haley | |
| 5,926,262 A | 7/1999 | Jung | |
| 6,056,821 A | 5/2000 | Nihongi | |
| 6,166,841 A | 12/2000 | Pringle | |
| 6,249,751 B1 | 6/2001 | Asaba et al. | |
| 6,449,384 B2 | 9/2002 | Di Venuto | |
| 6,539,325 B1 | 3/2003 | Numata | |
| 6,794,669 B2 | 9/2004 | Chelvayohan et al. | |
| 7,809,155 B2 | 10/2010 | Nestares | |
| 7,944,561 B2 | 5/2011 | Nisper et al. | |
| 8,345,252 B2 | 1/2013 | Nisper et al. | |
| 8,606,731 B2 | 12/2013 | Fujieda et al. | |
| 8,879,066 B2 | 11/2014 | Norris | |
| 9,007,588 B1 | 4/2015 | Igarashi | |
| 9,482,657 B2 | 11/2016 | Bell | |
| 2003/0208345 A1 | 11/2003 | O'Neill | |
| 2004/0111435 A1 | 6/2004 | Herbert et al. | |
| 2004/0218182 A1 | 11/2004 | Alman et al. | |
| 2005/0128484 A1 | 6/2005 | Rodrigues | |
| 2005/0169518 A1 | 8/2005 | Boston et al. | |
| 2005/0206383 A1 | 9/2005 | Park | |
| 2006/0030060 A1 | 2/2006 | Noguchi et al. | |
| 2006/0045831 A1 | 3/2006 | Galembeck | |
| 2006/0176479 A1 | 8/2006 | Laurence et al. | |
| 2006/0245632 A1 | 11/2006 | Nisper et al. | |
| 2007/0019887 A1 | 1/2007 | Nestares | |
| 2007/0172113 A1 | 7/2007 | Sai et al. | |
| 2007/0200337 A1 | 8/2007 | Johnson et al. | |
| 2007/0226158 A1 | 9/2007 | Woronow | |
| 2007/0250273 A1 | 10/2007 | De Haas | |
| 2007/0263265 A1* | 11/2007 | Sekine | H04N 1/603 358/518 |
| 2008/0052023 A1 | 2/2008 | Kettler | |
| 2008/0177586 A1 | 7/2008 | Jamjoom | |
| 2008/0235224 A1 | 9/2008 | Rodrigues | |
| 2008/0278592 A1* | 11/2008 | Kuno | H04N 9/04557 348/222.1 |
| 2008/0278723 A1 | 11/2008 | Merchak | |
| 2009/0015835 A1 | 1/2009 | Balakrishnen et al. | |
| 2009/0157212 A1 | 6/2009 | McClanahan | |
| 2009/0190839 A1 | 7/2009 | Higgins | |
| 2009/0213120 A1 | 8/2009 | Nisper et al. | |
| 2009/0292520 A1 | 11/2009 | Nwankpa | |
| 2010/0048242 A1 | 2/2010 | Rhoads | |
| 2010/0228511 A1 | 9/2010 | Chin et al. | |
| 2011/0045517 A1 | 2/2011 | Derringer et al. | |
| 2011/0170796 A1 | 7/2011 | Qian et al. | |
| 2011/0242562 A1 | 10/2011 | Vrhel | |
| 2011/0282613 A1 | 11/2011 | Skinner | |
| 2012/0225190 A1 | 9/2012 | Steenhoek | |
| 2012/0243797 A1 | 9/2012 | Di Venuto | |
| 2012/0303376 A1 | 11/2012 | Shishido | |
| 2013/0096438 A1 | 4/2013 | Fehre et al. | |
| 2013/0244197 A1 | 9/2013 | Tijoe | |
| 2014/0078293 A1 | 3/2014 | Beymore | |
| 2014/0118936 A1 | 5/2014 | Merlet et al. | |
| 2014/0242271 A1 | 8/2014 | Prakash et al. | |
| 2014/0250109 A1 | 9/2014 | Wang | |
| 2014/0278251 A1 | 9/2014 | Norris | |
| 2014/0278253 A1 | 9/2014 | Beymore | |
| 2014/0278254 A1 | 9/2014 | Beymore | |
| 2015/0023054 A1 | 1/2015 | Goda | |
| 2015/0127269 A1 | 5/2015 | Bell | |
| 2015/0134269 A1 | 5/2015 | Norris | |
| 2015/0134299 A1 | 5/2015 | Norris | |
| 2015/0134300 A1 | 5/2015 | Norris | |
| 2016/0307602 A1 | 10/2016 | Mertens | |
| 2017/0107576 A1* | 4/2017 | Babiarz | G16B 25/00 |
| 2017/0184452 A1 | 6/2017 | Baron et al. | |
| 2017/0233787 A1 | 8/2017 | Sebba et al. | |
| 2017/0242570 A1 | 8/2017 | Beymore et al. | |
| 2018/0125207 A1 | 5/2018 | Shami | |
| 2019/0120695 A1 | 4/2019 | Liefferink | |
| 2019/0301935 A1 | 10/2019 | Borremans et al. | |
| 2019/0332254 A1 | 10/2019 | Norris et al. | |

FOREIGN PATENT DOCUMENTS

| | | |
|---|---|---|
| CN | 101184986 | 5/2008 |
| CN | 101646929 | 2/2010 |
| CN | 101784871 | 7/2010 |
| CN | 102549545 | 7/2012 |
| JP | 07150081 | 6/1995 |
| JP | 2002236850 | 8/2002 |
| JP | 2006053070 A | 2/2006 |
| JP | 2006277555 | 10/2006 |
| JP | 2006284601 A | 10/2006 |
| JP | 2007218895 | 8/2007 |
| JP | 2008039525 A | 2/2008 |
| JP | 2008215914 A | 9/2008 |
| JP | 2010242018 | 10/2010 |
| KR | 20100102147 | 9/2010 |
| TW | 200608310 | 3/2006 |
| TW | I298466 | 7/2008 |
| TW | 200834273 | 8/2008 |
| TW | 201339652 | 10/2013 |
| WO | 2003063719 | 8/2003 |
| WO | 2006096521 | 9/2006 |
| WO | 2006112864 | 10/2006 |
| WO | 2007096402 | 1/2009 |
| WO | 2013049792 | 4/2013 |
| WO | 2013116192 | 8/2013 |
| WO | 2014150337 | 9/2014 |

OTHER PUBLICATIONS

Office Action for U.S. Appl. No. 14/535,380 dated Apr. 2, 2018.
Office Action for U.S. Appl. No. 14/535,372 dated Apr. 26, 2018.
*Alice* vs *CLS Bank* (Supreme Court Decision) (2013).
Anonymous, "Chapter 1.3.5.17. Detection of Outliers", NIST/SEMATECH e-Handbook of Statistical Methods, Jan. 1, 2012, Xp055162021.
Beymore, Paul M. U.S. Appl. No. 14/121,869, "Pigment Identification of Complex Coating Mixtures with Sparkle Color", filed Oct. 28, 201.
D. Puig, M.A. Garcia, J. Melendez: "Application-(dependent feature slection for texture classification", Pattern Recognition, vol. 43, No. 10, May 10, 2010 (May 10, 2010) pp. 3182-3297, XP027095420, DOI: 10.1016/j.patcog.2010.05.005 abstract and section 3.
E. Kirchner: "Appearance and measurement modeling an drendering of hte visual texture of automotive paints", Detroit Color Council, Mar. 13, 2013, XP055153196, Retrieved from the Internet: URL: http://www.detroitcc.org/files/2013March14b.pdf, [retreived on Apr. 3, 2013] Models for predicting texture.
E.J.J Kirchner, J. Ravi: "Setting tolerances on color and texture for automotive coating", Color Research & Application, vol. 39, No. 1, Jul. 25, 2012 pp. 88-98, XP055152561, DOI: 10.1002/col.21767.
Harkins et al. "Identification of pigments in paint products by infrared spectroscopy," Analytical Chemistry, 1959.
I. Lissner, U. Philipp: "Upgrading Color-Difference Formulas", Jouranl fo the Optical Society of America, vol. 27, No. 7, Jun. 11, 2010 (Jun. 11, 2010), pp. 1620-1629, XP055152562, DOI: 10,1364/JOSAA.27.001620 Sections 1 and 2.A.
International Search Report and Written Opinion for application No. PCT/US2014/022983 dated Nov. 28, 2014.
J.H. Xin, S. Shao, K.F.-L. Chung: "Colour-appearance modelling using feedforward networks with Bayesian regulariztion method-part 1: forward model" Color Research & Application, vol. 25, No. 6, Oct. 13, 2000, pp. 424-434, XP055152560, DOI: 10.1002/1520-6378(200012)25:6<424:"AID_COL7>3.0CO;2-Q.
Janina et al. "Examination of multilayer paint coats by the use of infrared, Raman and XRF spectroscopy for forensic purposes" J. of Molecular Structure, 2006.

(56) References Cited

OTHER PUBLICATIONS

Kokla, Vassiliki et al. "A Bayesian decision model for watercolour analysis," Proc. of SPIE, 2007, vol. 6618, pp. 66180S-1-66180S-9.
Kuncheva, Ludmila I., James C. Bezdek, and Robert PW Duin, "Decision templates for multiple classifier fusion: an experimental comparison" Pattern Recognition, 34.2. 2001.
Massonnet et al. "Identification of organic pigments in coatings: applications to red automotive topcoats" First Meeting of the European Academy of Forensic Sciences, 1997.
Paravina et al. "Evaluation of blending effect of composites related to restoration size", Dental Materials, Elsevier, Amsterdam, NL, vol. 22, No. 4, Apr. 1, 2006, pp. 299-307, XP027943381, ISSN: 0109-5641 table 2.
PPG Automotive Refinish: "RapidMatchTMX-5: guida utente", Pittsburgh Plate Glass (PPG) Industries, 2013, XP055153237, retreived from the internet: URL: http://it.nexaautocolor.com/media/213903/rapidmatch_v1-2012_email_version.pdf [retreived on Sep. 22, 2014].
Rafik, "Bulk optical properties of phthalocayanin pigment particles", Can. J. Chem. 1980.
Sun, et al. Crooks in Molecular Interaction Between Organized, Surface Confided Monolayers and Vapor-Phas Probe Molecules. 5. Acid-Based Interactions, 1993, American Chemical Society, pp. 1775-1780.
Takagi et al. "Prediction of spectral reflectance factor distribution of color-shift paint finishes" Color Research & Application, John Wiley and Sons, Inc., US, vol. 32, No. 5, Oct. 1, 2007, pp. 378-387, XP002604927, ISSN: 0361-2317.
Wang Qiang "Texture Analysis and Classification Based on Bayesian Network Model", Computer Aided Design & Computer Graphics, Dec. 31, 2007, pp. 1565-1568.
Chinese Office Action for application No. 201480015524.6 dated Dec. 26, 2016.
Chinese Office Action for application No. 201480015523.1 dated Feb. 7, 2017.
Japanese Office Action for application No. JP2016-501119 dated Nov. 7, 2016.
Korean Office Action for application No. 2015-7025129 dated Dec. 29, 2016.
Korean Office Action for application No. 2015-07025129 dated Jun. 21, 2016.
Korean Office Action for application No. 2015-7025121 dated Jan. 31, 2017.
Korean Office Action for application No. 2015-7025121 dated Jul. 25, 2016.
Office Action in application No. 201480070100.x dated Feb. 27, 2017.
Taiwan Office Action for application No. 103109480 dated Jul. 17, 2016.
Taiwan Office Action for application No. 103109480 dated Sep. 17, 2015.
Office Action for U.S. Appl. No. 13/832,116 dated Mar. 5, 2014.
Office Action for U.S. Appl. No. 13/835,675 dated Sep. 16, 2015.
Office Action for U.S. Appl. No. 13/832,554 dated Sep. 23, 2015.
Office Action for U.S. Appl. No. 13/835,675 dated Feb. 4, 2016.
Office Action for U.S. Appl. No. 13/832,554 dated Apr. 20, 2016.
Notice of Allowance for U.S. Appl. No. 13/835,675 dated Nov. 1, 2016.
Office Action for U.S. Appl. No. 14/535,399 dated Apr. 4, 2017.
Office Action for U.S. Appl. No. 14/535,380 dated Apr. 12, 2017.
Office Action for U.S. Appl. No. 13/832,554 dated May 2, 2017.
Office Action for U.S. Appl. No. 13/835,675 dated May 2, 2017.
Office Action for U.S. Appl. No. 14/535,372 dated Jun. 20, 2017.
Office Action for U.S. Appl. No. 13/832,554 dated Sep. 6, 2017.
Office Action for U.S. Appl. No. 14/535,372 dated Oct. 6, 2017.
Office Action for U.S. Appl. No. 14/535,380 dated Oct. 27, 2017.
Office Action for U.S. Appl. No. 14/535,399 dated Nov. 1, 2017.
Office Action for U.S. Appl. No. 13/835,675 dated Dec. 12, 2017.
Office Action for U.S. Appl. No. 13/832,554 dated Dec. 12, 2017.
Office Action for U.S. Appl. No. 14/535,372 dated Feb. 15, 2018.
Office Action for U.S. Appl. No. 14/535,399 dated Mar. 21, 2018.
Office Action dated Mar. 26, 2018 from U.S. Appl. No. 13/832,554, filed Mar. 15, 2013.
Office Action dated Oct. 30, 2018 from U.S. Appl. No. 13/832,554, filed Mar. 15, 2013.
Notice of Allowance dated Jul. 9, 2019 from U.S. Appl. No. 13/832,554, filed Mar. 15, 2013.
Notice of Allowance dated Aug. 9, 2019 from U.S. Appl. No. 13/832,554, filed Mar. 15, 2013.
Office action dated Jul. 31, 2017 from Chinese Patent Application No. 201480015524 filed Mar. 10, 2014.
Notice of Grant dated Nov. 3, 2017 from Chinese Patent Application No. 201480015524 filed Mar. 10, 2014.
International Search Report dated Dec. 4, 2014 from International Patent Application No. PCT/US2014/022369 filed Mar. 10, 2014.
International Preliminary Report on Patentability dated Sep. 15, 2015 from International Patent Application No. PCT/US2014/022369 filed Mar. 10, 2014.
Office action dated Feb. 28, 2017 from Korean Patent Application No. 20157025129 filed Mar. 10, 2014.
Exam Report dated Apr. 10, 2019 from European Patent Application No. 14717546 filed Mar. 10, 2014.
Office Action dated Oct. 14, 2016 from Japanese Patent Application No. 2016500952 filed Mar. 10, 2014.
Office Action dated Jun. 16, 2017 from Japanese Patent Application No. 2016500952 filed Mar. 10, 2014.
Decision to Grant dated Feb. 2, 2018 from Japanese Patent Application No. 2016500952 filed Mar. 10, 2014.
Office Action dated Dec. 15, 2016 from Canadian Patent Application No. 2903458 filed Mar. 10, 2014.
Office Action dated May 2, 2017 from U.S. Appl. No. 13/835,675, filed Mar. 15, 2013.
Notice of Allowance dated Apr. 13, 2018 from U.S. Appl. No. 13/835,675, filed Mar. 15, 2013.
Notice of Allowance dated Aug. 7, 2018 from U.S. Appl. No. 13/835,675, filed Mar. 15, 2013.
Issue Notification dated Nov. 14, 2018 from U.S. Appl. No. 13/835,675, filed Mar. 15, 2013.
International Report on Patentability dated Sep. 15, 2015 from International Patent Application No. PCT/US2014/022983 filed Mar. 11, 2014.
Office Action dated Aug. 11, 2017 from Chinese Patent Application No. 201480015523.1 filed Mar. 11, 2014.
Notification of Grant dated Dec. 14, 2017 from Chinese Patent Application No. 201480015523.1 filed Mar. 11, 2014.
Decision to Grant dated May 16, 2017 from Japanese Patent Application No. 2016-50119 filed Mar. 11, 2014.
Office Action dated Dec. 9, 2016 from Canadian Patent Application No. 2903466 filed Mar. 11, 2014.
Niedzinski, Cezary et al. And Bayesian Approach to Spectrophotometric Analysis of Multicomponent Substances and IEEE Transactions on Instrumentation and Measurement, Jun. 2000, vol. 49, No. 3, pp. 67-642.
Non-Final Office Action for U.S. Appl. No. 15/963,567, dated Sep. 4, 2020, 8 pages.
Non-Final Office Action for U.S. Appl. No. 15/963,790, dated Apr. 15, 2020, 7 pages.
Non-Final Office Action received for U.S. Appl. No. 15/963,686, dated Jul. 20, 2020, 22 pages.
Notice of Allowance for U.S. Appl. No. 15/963,790, dated Jul. 29, 2020, 7 pages.
Examiner Interview Summary received for U.S. Appl. No. 15/963,790, dated Nov. 23, 2020, 1 page.
Notice of Allowance received for U.S. Appl. No. 15/963,790, dated Oct. 21, 2020.
Corrected Notice of Allowance received for U.S. Appl. No. 15/963,686, dated Mar. 8, 2021, 2 pages.

* cited by examiner

| Wavelength | Angle | Reflectance Factor |
|---|---|---|
| 400 | 15 | 22.03 |
| 410 | 15 | 25.94 |
| 420 | 15 | 27.88 |
| 430 | 15 | 29.03 |
| 440 | 15 | 29.67 |
| 450 | 15 | 30.04 |
| 460 | 15 | 30.02 |
| 470 | 15 | 29.73 |
| 480 | 15 | 29.09 |
| 490 | 15 | 28.24 |
| 500 | 15 | 27.12 |
| 510 | 15 | 25.56 |
| 520 | 15 | 23.79 |
| 530 | 15 | 22.04 |
| 540 | 15 | 20.62 |
| 550 | 15 | 19.31 |
| 560 | 15 | 17.93 |
| 570 | 15 | 16.91 |
| 580 | 15 | 16.36 |
| 590 | 15 | 16.11 |
| 600 | 15 | 16.03 |
| 610 | 15 | 15.85 |
| 620 | 15 | 15.8 |
| 630 | 15 | 16.15 |
| 640 | 15 | 17.16 |
| 650 | 15 | 18.55 |
| 660 | 15 | 19.99 |
| 670 | 15 | 21.23 |
| 680 | 15 | 22.45 |
| 690 | 15 | 23.92 |
| 700 | 15 | 25.74 |
| 400 | 45 | 2.58 |
| 410 | 45 | 3 |
| 420 | 45 | 3.14 |
| 430 | 45 | 3.21 |
| 440 | 45 | 3.26 |
| 450 | 45 | 3.27 |
| 460 | 45 | 3.25 |
| 470 | 45 | 3.21 |
| 480 | 45 | 3.14 |
| 490 | 45 | 3.03 |
| 500 | 45 | 2.92 |
| 510 | 45 | 2.77 |
| 520 | 45 | 2.59 |
| 530 | 45 | 2.41 |
| 540 | 45 | 2.26 |
| 550 | 45 | 2.13 |
| 560 | 45 | 2.01 |
| 570 | 45 | 1.92 |
| 580 | 45 | 1.88 |
| 590 | 45 | 1.86 |
| 600 | 45 | 1.84 |
| 610 | 45 | 1.83 |
| 620 | 45 | 1.84 |
| 630 | 45 | 1.91 |
| 640 | 45 | 2.03 |
| 650 | 45 | 2.19 |
| 660 | 45 | 2.35 |
| 670 | 45 | 2.49 |
| 680 | 45 | 2.65 |
| 690 | 45 | 2.85 |
| 700 | 45 | 3.08 |
| 400 | 110 | 0.86 |
| 410 | 110 | 0.99 |
| 420 | 110 | 1.02 |
| 430 | 110 | 1 |
| 440 | 110 | 0.98 |
| 450 | 110 | 0.95 |
| 460 | 110 | 0.93 |
| 470 | 110 | 0.89 |
| 480 | 110 | 0.86 |
| 490 | 110 | 0.82 |
| 500 | 110 | 0.77 |
| 510 | 110 | 0.74 |
| 520 | 110 | 0.69 |
| 530 | 110 | 0.65 |
| 540 | 110 | 0.61 |
| 550 | 110 | 0.59 |
| 560 | 110 | 0.57 |
| 570 | 110 | 0.57 |
| 580 | 110 | 0.57 |
| 590 | 110 | 0.57 |
| 600 | 110 | 0.56 |
| 610 | 110 | 0.57 |
| 620 | 110 | 0.58 |
| 630 | 110 | 0.6 |
| 640 | 110 | 0.64 |
| 650 | 110 | 0.68 |
| 660 | 110 | 0.71 |
| 670 | 110 | 0.74 |
| 680 | 110 | 0.78 |
| 690 | 110 | 0.83 |
| 700 | 110 | 0.89 |

*Fig. 8*

| Colorant | Probability |
|---|---|
| A | 0 |
| B | 7.58 E-18 |
| C | 6.02 E-21 |
| D | 0 |
| E | 3.05 E-05 |
| F | 0.00242 |
| G | 0.00253 |
| H | 1 |
| I | 6.7 E-27 |
| J | 0 |
| K | 0 |
| L | 0 |
| M | 1 |
| N | 0.00798 |
| O | 0 |
| P | 0 |
| Q | 0 |
| R | 0 |
| S | 0 |
| T | 0 |
| U | 0 |
| V | 0 |
| W | 1.38 E-26 |
| X | 1 |
| Y | 1 |
| Z | 0 |

SYSTEMS AND METHODS FOR RAPID COATING COMPOSITION DETERMINATIONS

BACKGROUND

Modern coatings provide several important functions in industry and society. Coatings can protect a coated material from corrosion, such as rust. Coatings can also provide an aesthetic function by providing a particular color and/or texture to an object. For example, most automobiles are coated using paints and various other coatings in order to protect the metal body of the automobile from the elements and also to provide aesthetic visual effects.

In view of the wide-ranging uses for different coatings, it is often necessary to identify a target coating composition. For instance, it might be necessary to identify a target coating on an automobile that has been in an accident. If the target coating is not properly identified, any resulting repair to the automobile's coating will not match the original coating. As used herein, a target coating comprises any coating of interest that has been applied to any physical object.

There are many opportunities for new methods and systems that improve the identification of coatings.

BRIEF SUMMARY

The present invention comprises systems, methods, and computer program products for parallel processing of spectrometric data when identifying coating texture effects. For example, a computer system of the present invention can comprise one or more processors and one or more computer-storage media having stored thereon executable instructions that when executed by the one or more processors configure the computer system to perform various actions.

The computer system may receive spectrometric data from a target coating. The computer system also initiates a first set of colorant decision points. The first set of colorant decision points comprise a first colorant decision point for identifying a probability that a first effect pigment type is present within a target coating. The first colorant decision point comprises a first set of independent calculations of the spectrometric data that each provide an independent assessment about the presence of the first effect pigment type within the target coating. The first set of colorant decision points also comprises a second colorant decision point for identifying a probability that a second effect pigment type is present within the target coating. The second colorant decision point comprising a second set of independent calculations of the spectrometric data that each provide an independent assessment about the presence of the second effect pigment type within the target coating. The first set of independent calculations can be different than the second set of independent calculations.

The computer system calculates in parallel each colorant decision point within the first set of colorant decision points. Each colorant decision point provides a probability that a different effect pigment type is present within the target coating. The computer system then calculates a set of final colorant probabilities. Each final colorant probability within the set of final colorant probabilities is calculated by combining a unique subset of probabilities calculated by the first set of colorant decision points. Additionally, each final colorant probability indicates a probability that an associated colorant is present within the target coating.

The present invention can also comprise a method for parallel processing of spectrometric data when identifying coating texture effects. The method comprises receiving spectrometric data from a target coating. The method also comprises initiating a first set of colorant decision points. The first set of colorant decision points comprises a first colorant decision point for identifying a probability that a first effect pigment type is present within a target coating. The first colorant decision point comprises a first set of independent calculations of the spectrometric data that each provide an independent assessment about the presence of the first effect pigment type within the target coating. The first set of colorant decision points also comprises a second colorant decision point for identifying a probability that a second effect pigment type is present within the target coating. The second colorant decision point comprises a second set of independent calculations of the spectrometric data that each provide an independent assessment about the presence of the second effect pigment type within the target coating. The first set of independent calculations can be different than the second set of independent calculations.

Additionally, the method comprises calculating in parallel each colorant decision point within the first set of colorant decision points. Each colorant decision point provides a probability that a different effect pigment type is present within the target coating. The method further comprises calculating a set of final colorant probabilities. Each final colorant probability within the set of final colorant probabilities is calculated by combining a unique subset of probabilities calculated by the first set of colorant decision points. Additionally, each final colorant probability indicates a probability that an associated colorant is present within the target coating.

Furthermore, the present invention can comprise a computer program product comprising one or more computer storage media having stored thereon computer-executable instructions that, when executed at a processor, cause the computer system to perform a method for parallel processing of spectrometric data when identifying coating texture effects. The method comprises receiving spectrometric data from a target coating. The method also comprises initiating a first set of colorant decision points. The first set of colorant decision points comprises a first colorant decision point for identifying a probability that a first effect pigment type is present within a target coating. The first colorant decision point comprises a first set of independent calculations of the spectrometric data that each provide an independent assessment about the presence of the first effect pigment type within the target coating. The first set of colorant decision points also comprises a second colorant decision point for identifying a probability that a second effect pigment type is present within the target coating. The second colorant decision point comprises a second set of independent calculations of the spectrometric data that each provide an independent assessment about the presence of the second effect pigment type within the target coating. The first set of independent calculations can be different than the second set of independent calculations.

Additionally, the method comprises calculating in parallel each colorant decision point within the first set of colorant decision points. Each colorant decision point provides a probability that a different effect pigment type is present within the target coating. The method further comprises calculating a set of final colorant probabilities. Each final colorant probability within the set of final colorant probabilities can be calculated by combining a unique subset of probabilities calculated by the first set of colorant decision points. Additionally, each final colorant probability indicates a probability that an associated colorant is present within the target coating.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above recited and other advantages and features of the invention can be obtained, a more particular description of the invention briefly described above will be rendered by reference to the appended drawings, which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 8 illustrates a table comprising spectrometric data.

DETAILED DESCRIPTION

Figure 1:
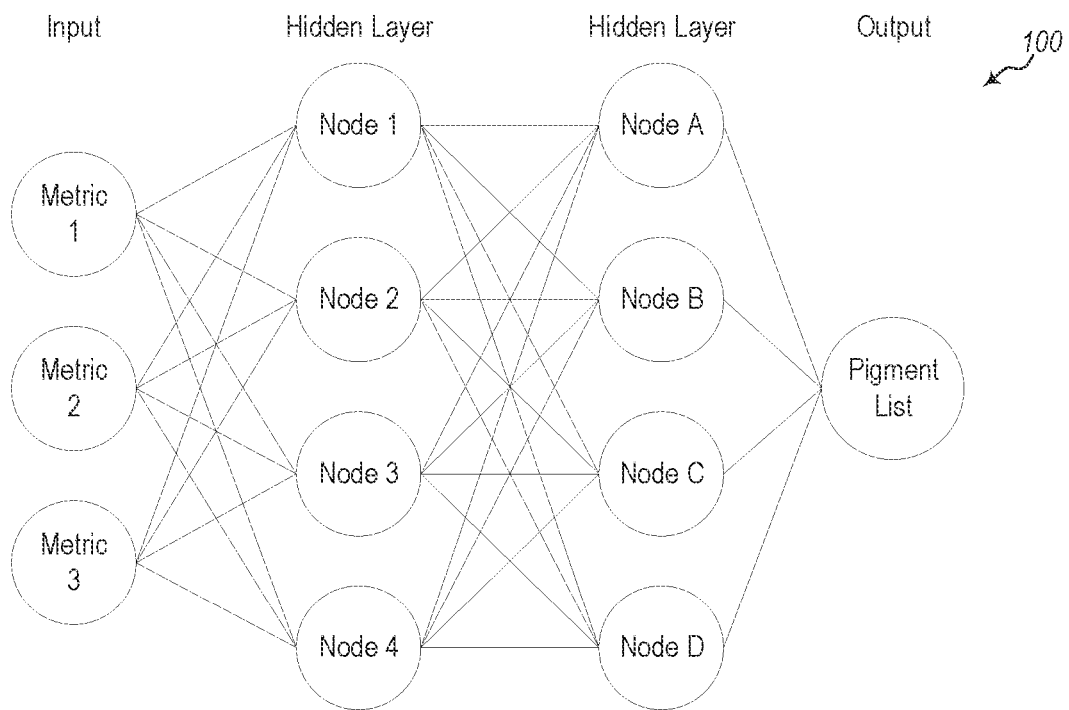
FIG. 1 depicts a schematic diagram of a conventional neural network.

The present invention extends to computerized systems, methods, and computer program products for parallel processing of spectrometric data in coating analysis, e.g. when identifying coating texture effects. The spectrometric data can comprise spectrophotometric data, spectrocolorimetric data, data acquired via image processing and/or any other similar data. For example, the present invention can comprise computer systems that initiate multiple decision points that are processed in parallel with each other. Each processed decision point provides a probability that a different effect pigment type is present within a target coating. Based upon the results of the individual decision points, the computer system identifies a set of final colorant probabilities that describe a set of individual colorants and a probability that each colorant is present within the target coating. As used herein, "potential colorants" (also referred to as "final colorants") are colorants that are identified by a probabilistic colorant analysis as likely being in a target coating. As used herein, colorants include pigments, such as effect pigments, dyes, inks, stains, and any other related coating or coating component. The colorants can be fed into a formulation engine in decreasing order of calculated probability of the final colorant being present in the target coating until an acceptable formulation match is identified. The present invention can generate accurate, reproducible results using this approach in a matter of seconds or less.

One of skill in the art will appreciate the need to correctly identify and match coatings. Automotive coatings, for example, provide a particularly challenging set of coating parameters to match. In addition to complex colorants, such as pigments, dyes, and inks, a conventional automotive coating may comprise effect pigments that provide texture to the coating. For instance, an automotive coating may comprise aluminum flakes of a particular color. The aluminum flakes may provide a texture that appears to sparkle. A proper identification of such a coating composition requires the correct identification of the presence of aluminum flakes and a proper identification of the color of the aluminum flakes.

In order to properly match a target coating, it is desirable to determine the components, or colorants, within the target coating. If the same colorants or appropriate offsets as those in the target coating are utilized, a formulation or search process may arrive at an apparent optimum solution as to the formulation of the target coating. On the other hand, excluding those colorants, either deliberately or inadvertently, from availability will result in a less than optimal color match.

Several existing formulation engines and methodologies attempt to encompass colorant selection and formulation via various algorithms. These algorithms are based on spectrometric data, or characterization data relating to attributes of the target coating. For example, spectrometric data may include spectrophotometric data, spectrocolorimetric data, data acquired via image processing, and/or related metrics. Many conventional colorant identification packages and formulation engines take a "brute" force, or guess-and-check, type of approach to provide formulations and colorant information to their users. The guess-and-check approach, or brute force method, is a frequently used method in which nearly all available colorants, or a subset of all available colorants, are combined in all combinations available given an end number of colorants desired in the final match.

Conventional "brute" force methods of coating identification can be inefficient. For example, conventional brute force methods consume significant processing time and large amounts of memory to store all of the available colorants. Additionally, in some cases, such methods may be error prone because they tend to work on a "good enough" basis. For example, these methods tend to not focus on identifying the actual components of a target coating. Rather, brute force methods generally iterate through all available colorants, until a particular output is a good enough visual match to the target coating, which in many cases may comprise very different colorants than those that are in the target coating.

More recently, manufacturers have gained interest in neural networks for identifying compositions of target coatings. Unfortunately, neural networks suffer from slow performance, inflexibility, error propagation, and a requirement of significant overhead to meticulously manage a sometimes-large learning database and structure. The inflexibility, or rigid operation, forces a neural network generally to be used in a feedback design to optimize the node weightings leading to and within the hidden layers of the network. A neural network requires this type of backpropagation of errors acquired from desired outputs in order to "learn." The actual learning, or training, of the neural network is based on the reduction of the calculated error given a desired output by repeated reintroduction of the input and adjustment of the weights based on the prior iteration's error.

FIG. 1 depicts a schematic diagram of an example of a conventional neural network 100. A conventional neural network 100 typically requires a nearly ideally defined input and requires significant effort to update and/or alter the various layers (nodes) if an error needs to be corrected or a new piece of information needs to be considered. Although fewer steps, compared to some prior art models, are apparent to the user, a neural network 100 tends to be relatively slow and unidirectional due to its nature of trying to encompass the resolution to a formulation or color search in one massive step. Neural networks 100 are resource intensive to create and also tend to be slow in use. For example, processing data about a coating using a neural network can take several minutes to hours in some cases to approximate components of the coating.

Figure 2:
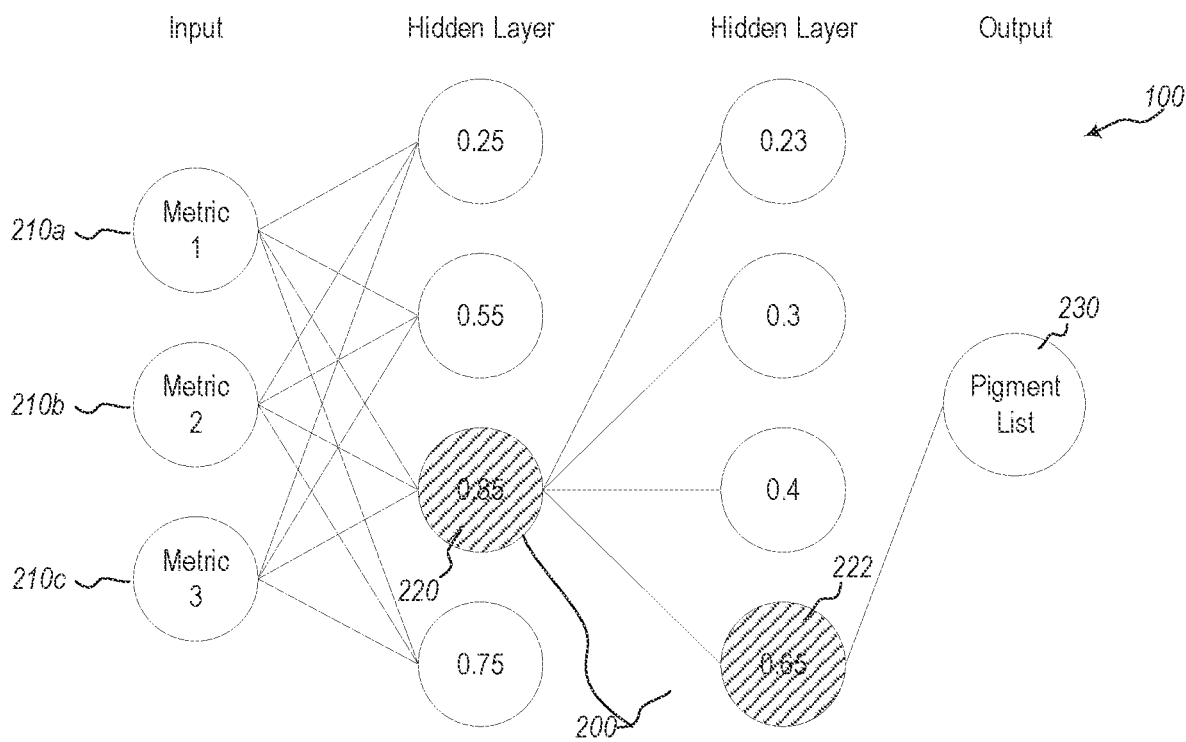
FIG. 2 depicts a schematic diagram of a conventional neural network providing a result through a particular pathway.

FIG. 2 depicts a schematic diagram of an example of a conventional neural network 100 providing a result through a particular pathway 200. The particular pathway comprises the subset of decision points that the neural network 100 follows in order to arrive at a result. In the depicted example, the neural network 100 propagated from a set of inputs 210(a-c) to decision point 220 to decision point 222 and then to the output 230. For the sake of example, each decision point in FIG. 2 is depicted with an accuracy rating. For example, decision point 220 has an accuracy rating of 0.85, which is the highest rating among that particular layer. One will appreciate, however, that the use of accuracy ratings is merely for the sake of simplicity and that in practice, selection of a particular decision point may be based upon much more complicated considerations.

Because decision point 220 has the highest accuracy rating within its group, the neural network 100 chooses to propagate forward from that particular decision point 220. The neural network 100 is unidirectional in this way because the system feeds errors back into the neural network 100 through a feedback loop and data is propagated forward in the neural network 100.

Figure 3:
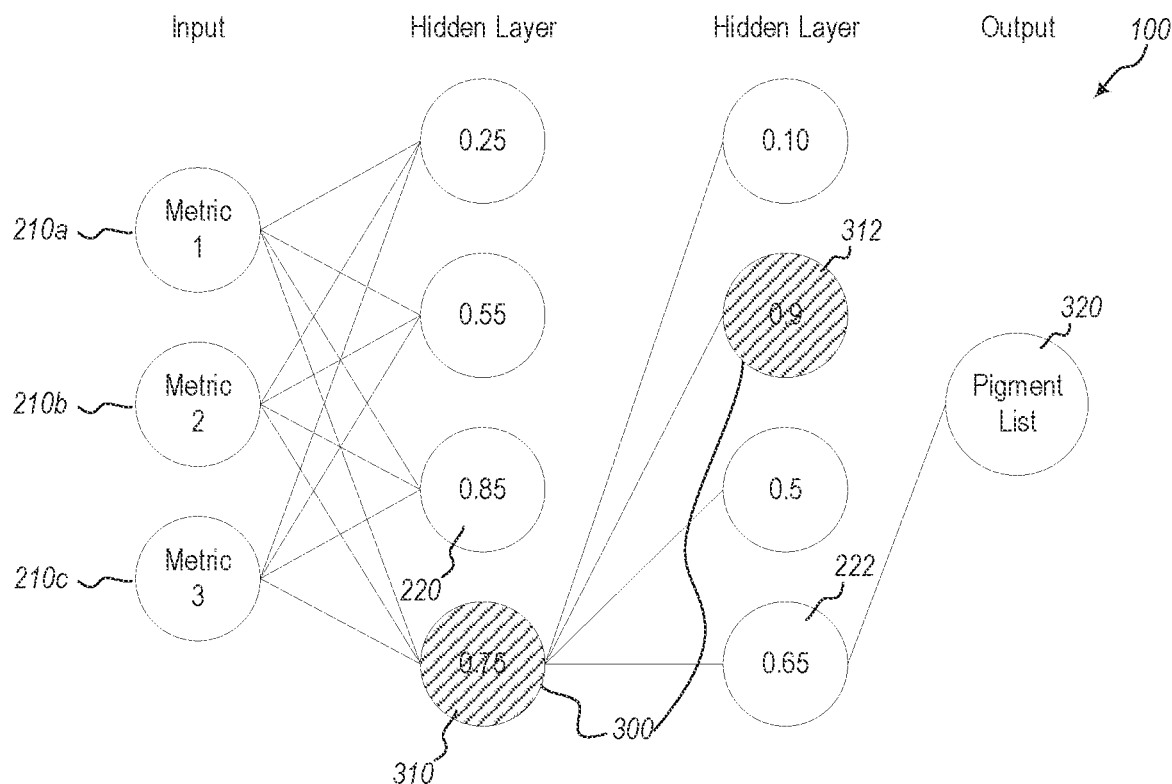
FIG. 3 depicts a schematic diagram of a conventional neural network providing a result through an alternate pathway.

FIG. 3 depicts a schematic diagram of the same conventional neural network 100 providing a result through a different pathway 300 than FIG. 2. In particular, in FIG. 3 the neural network 100 receives inputs 210(a-c) and then propagates to decision point 310. It should be noted, that a conventional neural network would propagate to decision point 220 because decision point 220 comprises a higher accuracy rating than decision point 310. In this example, however, the propagation to decision point 310 is being depicted in order to illustrate a further deficiency within neural networks 100. In particular, after propagating to decision point 310, the neural network 100 is then able to propagate to decision point 312. Decision point 312 comprises an accuracy rating of 0.9 which is significantly higher than the final accuracy rating available when the neural network propagated forward from decision point 220.

As depicted in FIGS. 2 and 3, the unidirectional nature of neural networks can result in incorrect outputs. For example, a neural network may make a decision at an initial decision-point layer that leads to a less optimum final outcome. For example, if the neural network 100 would have selected the technically incorrect decision point 310 within the first hidden layer, it would have arrived at decision point 312 which has a far higher accuracy rating than decision point 222, which is the decision point that the correct selection of decision point 220 led to. Accordingly, neural networks suffer from significant deficiencies including speed, accuracy, and inflexibility.

The coating identification methods and systems of the present invention provide a highly flexible platform for coating identification. For instance, the coating identification methods and systems can process the entire set of decision points in parallel because the decision points are each independent and do not require propagation of results. Providing the coating identification methods and systems with the entire data set of all decision point results, gives the coating identification methods and systems significant flexibility to manipulate and process the data as desired.

Additionally, disclosed coating identification methods and systems may also be more accurate than conventional methods and systems. For example, disclosed coating identification methods and systems are able to leverage an entire data set of decision point results when identifying final colorant probabilities. In contrast, unidirectional methods and systems, such as neural networks, only provide results that are based upon the specific decision point that the neural network traversed. By having access to the entire data set of decision point results, disclosed coating identification methods and systems are not susceptible to incorrect calculation pathways. Instead, disclosed coating identification methods and systems process the entire dataset to identify final colorant probabilities.

In particular, a coating identification computer system can also provide significant speed increases over neural network systems. For example, in one laboratory experiment using a test sample, a conventional neural network required 64 seconds to produce a coating identification result. In contrast, an embodiment of a disclosed coating identification system, required only 20 seconds to provide a coating identification result, which is a three-times improvement over the conventional system. A coating identification computer system may be particularly suited for parallel processing which provides significant speed increases compared to conventional systems.

Accordingly, coating identification computer systems and related methods comprise unique and innovative technical structures, processes, and applications that provide several technical benefits. For example, such a coating identification computer system may comprise a logical structure that easily allows for parallel processing. Additionally, the coating identification computer system may calculate an entire dataset of decision points. By providing the entire dataset of decision points results, the coating identification system is able to arrive at highly accurate results that are not dependent on prior logical pathways being correctly chosen. While a few technical benefits have been explicitly pointed out for the sake of example, one will appreciate that additional technical benefits may be provided according to the present invention.

Figure 4:
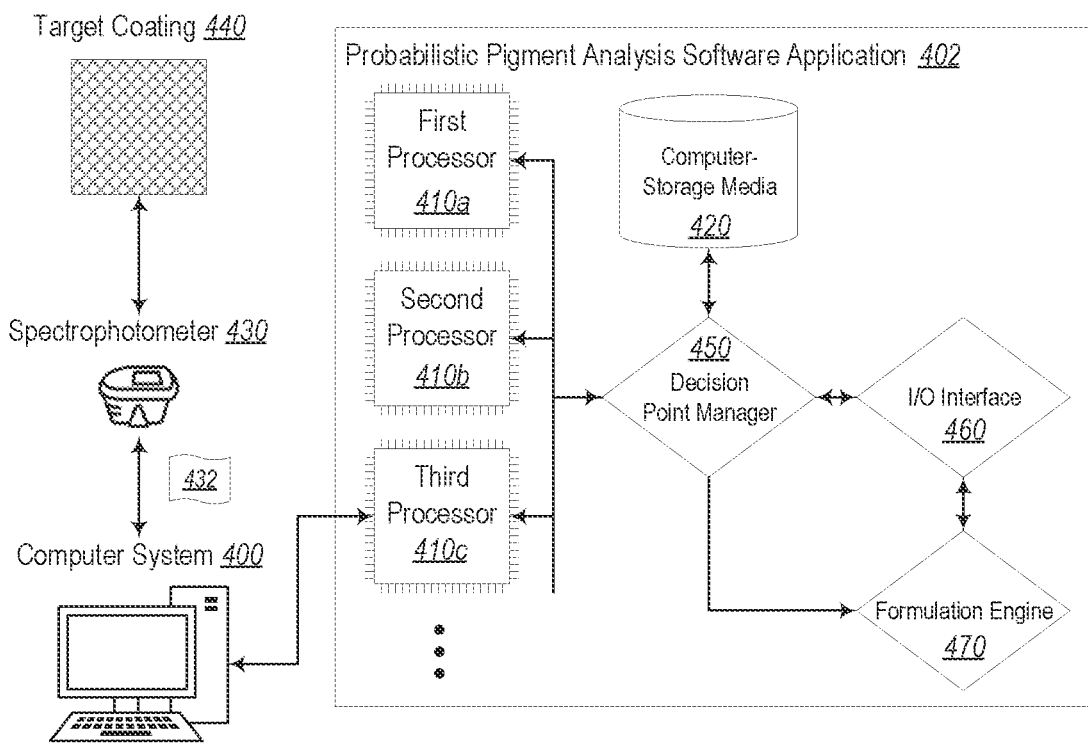
FIG. 4 illustrates a schematic diagram of a computerized system comprising a computer system for parallel processing of spectrometric data when identifying coating texture effects.

Turning now to the figures, FIG. 4 illustrates a schematic diagram of a computerized system comprising a computer system 400 of the present invention for parallel processing of spectrometric data in coating analysis for identifying coating colorants. With respect to FIG. 4, the computer system 400 is described in the exemplary context of identifying texture effects, such as aluminum, organic mica, or man-made mica; however, one will appreciate that the computer system 100 could additionally or alternatively be used to identify any type of colorant. As used herein, a computer system comprises any combination of one or more processors 410(a-c) and computer-readable storage media 420. For example, a processor (e.g., processor 410a) may comprise an integrated circuit, a field-programmable gate array (FPGA), a microcontroller, an analog circuit, or any other electronic circuit capable of processing input signals. Examples of computer-readable storage media 420 include RAM, ROM, EEPROM, solid state drives ("SSDs"), flash memory, phase-change memory ("PCM"), optical disk storage, magnetic disk storage or other magnetic storage devices, or any other hardware storage device(s).

The computer system 400 can comprise one or more computer-readable storage media 420 having stored thereon executable instructions that when executed by the one or more processors 410(a-c) configure the computer system 400 to execute a probabilistic colorant analysis software application 402. As used herein, a "probabilistic colorant analysis" comprises an analysis of a target coating 140 that produces one or more potential colorants and probabilities associated with the likelihood that each of the potential colorants is present within the target coating 440.

For example, the probabilistic colorant analysis software application 402 can cause the computer system 400 to receive spectrometric data 432 from a target coating 440. The spectrometric data 432 may comprise spectrophotometric data that is gathered by a spectrophotometer 430 or any other device capable of scanning a target coating 440 and providing characterization data relating to attributes of the target coating 440. As such, the spectrometric data can comprise spectrophotometric data, spectrocolorimetric data, and/or any other similar data.

A decision point manager 450 can then initiate a set of colorant decision points. As used herein, a decision point manager 450 comprises a software and/or hardware component that manages the initiation and processing of colorant decision points within the probabilistic colorant analysis software application 402. Additionally, as used herein, a colorant decision point comprises a set of independent calculations of the spectrometric data 432 that each provide an independent assessment about the presence of a particular effect pigment type within the target coating 440 and that are individually weighted by the colorant decision point to provide a probability that the particular effect pigment type is within the target coating 440. As used herein, an independent calculation comprises an independent assessment about the presence of a particular effect pigment type within the target coating 440 that does not require as an input the output of any other independent calculation within a respective colorant decision point. Initiating a colorant decision point can comprise loading the colorant decision point from a computer-readable storage medium.

When initiating the set of colorant decision points, the decision point manager 450 can initiate multiple, different decision points. For example, the decision point manager 450 may initiate a second colorant decision point for identifying a probability that a second effect pigment type is present within the target coating 400. The second colorant decision point can comprise a second set of independent calculations of the spectrometric data 432 that each provide an independent assessment about the presence of the second effect pigment type within the target coating 440. The first set of independent calculations associated with a first colorant decision point may be different than the second set of independent calculations associated with the second colorant decision point. For example, the first colorant decision point may be directed towards identifying the presence of an aluminum texture effect pigment while the second colorant decision point may be directed towards identifying the presence of a translucent or transparent texture effect pigment, such as a mica effect pigment. Similarly, the second set of independent calculations associated with a second colorant decision point may be a subset of the first set of independent calculations associated with the first colorant decision point. For example, the first colorant decision point may be directed toward identifying the presence of an aluminum texture effect pigment while the second colorant decision point may be directed toward identifying the presence of lenticularly-shaped aluminum texture effect pigments.

Once the system 100 initiates the set of colorant decision points, the decision point manager 450 manages the parallel processing of the colorant decision points. The decision point manager 450 may calculate the colorant decision points in parallel by initiating a calculation of a first set of independent calculations associated with a first colorant decision point and a second set of independent calculations associated with a second colorant decision point within parallel threads. For example, the decision point manager 450 provides different colorant decision points to a first processor 410a, a second processor 410b, a third processor 410c, and so forth. One of skill in the art will appreciate that modern processing units comprise various different parallel processing functionalities and capabilities. For instance, many modern processing units comprise multiple cores on a single silicon die. Further, some modern processing units also provide multiple virtual cores that allow the simultaneous processing of multiple threads on a single core.

The decision point manager 450 represents an abstraction of the multi-threaded nature of the colorant decision points. At least a portion of the colorant decision points are capable of being processed as independent threads within a parallel processing system. Each independent calculation within each colorant decision point may also be capable of being processed as an independent thread within a parallel processing system. The decision point manager 450 manages the parallel processing of each colorant decision point and also tracks the calculated results received from each independent calculation and each colorant decision point.

Once the decision point manager 450 completes the parallel calculations, each colorant decision point (e.g., 710a-g, FIG. 7) provides a probability that the particular effect pigment type is present within a target coating 440. The probabilities are each calculated based upon a weighted combination of the results of each independent calculation within the set of independent calculations. The particulars of the weighting of the "weighted combination" is described more fully below. The weighted probabilities provided by independent calculations can be summed, or otherwise combined, and normalized to provide a colorant decision point probability for the associated particular effect pigment type. Using the various probabilities provided by the colorant decision points, the decision point manager 450 can then calculate a set of final colorant probabilities. The decision point manager 450 can calculate this by combining a unique subset of probabilities calculated by the first set of colorant decision points. Each final colorant probability indicates a probability that an associated colorant is present within the target coating.

Once the decision point manager 450 calculates the final colorant probabilities, the probabilistic colorant analysis software application 402 may provide at least a portion of the final colorant probabilities to an end user through an input/output (I/O) interface 460. The I/O interface may comprise a computer display that lists a particular number of the final colorant probabilities in order of highest probability. The end user can then interact with the interface 460 to manually review the list and identify colorants of interest, or eliminate those the end user deems irrelevant.

Additionally, the probabilistic colorant analysis software application 402 can add at least a portion of the colorants within the set of final colorants to a formulation engine (e.g., 470). As used herein "final colorants" refer to colorants that are identified by the probabilistic colorant analysis software application 402 as potentially being present within a target coating 440, and/or that the user has accepted for submission into the formulation engine. Each final colorant is associated with a probability (also referred to herein as a "final colorant probability") that indicates the likelihood that the final colorant is present within the target coating. Additionally, each final colorant may be associated with calculated probabilities above a threshold probability. For example, the probabilistic colorant analysis software application 402 may limit the set of final colorants to only colorants that are associated with a probability that is above a threshold level. The system 400 can further allow the end user to accept and/or discard the colorants shown on the display. In either case, the system 400 ultimately provides a narrowed subset of colorant (the final colorants) based purely on probabilistic analysis, and/or based on a combination of probabilistic analysis and human input.

The formulation engine 470 may comprise any formulation process capable of generating a coating composition based upon potential colorants. The potential colorants are fed into a formulation engine. For example, the formulation engine may utilize a Kubelka-Munk formulation process. The formulation engine 470 can be configurable to send any resulting formulation to the I/O interface 460. The I/O interface can then display the resulting formulation to the end user and/or communicate the formulation to a coating mixing machine in communication with the computer system for production of the corresponding coating formulation.

Figure 5:
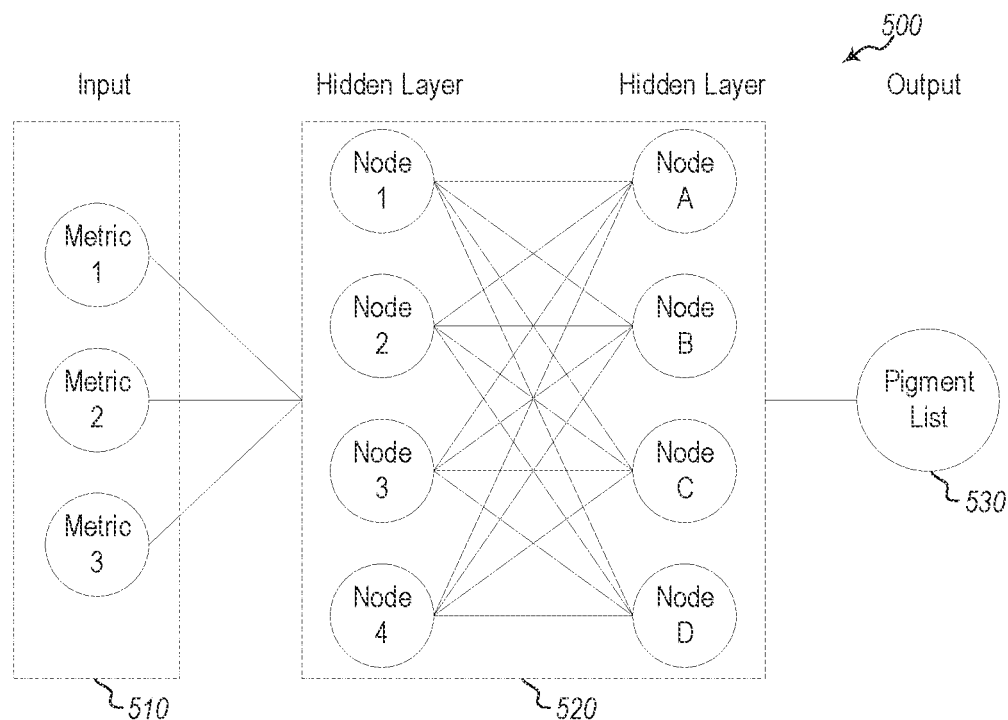
FIG. 5 illustrates a schematic diagram of a probabilistic colorant analysis system.

As further explanation and example of the function of colorant decision points, FIG. 5 illustrates a schematic diagram of a probabilistic colorant analysis system that comprises a set of colorant decision points 500. The depicted colorant decision points 500 are separated into an input group 510, a hidden layer 520, and an output 530. The colorant decision points 500 can be otherwise separated into different sets. Further, the output 530 can comprise a formulation engine.

The system 400 can process the colorant decision points 500 within the hidden layer 520 in parallel. The lines connecting the different colorant decision points 500 to each other do not indicate a flow or order of processing. Instead, the lines indicate probabilistic relations that will be described further below. Additionally, the input group 510 can comprise a set of metrics, such as angle data, related to the spectrometric data for input into the decision points and/or may also comprise a second set of colorant decision points 500 that must be calculated prior to the calculation of the first set of colorant decision points 500 within the hidden layer 520. For example, prior to processing the first set of colorant decision points 500 within the hidden layer, the system may initiate a second set of colorant decision points 500 within the input group 510. The second set of colorant decision points 500 within the input group 510 are different than the first set of colorant decision points 500 within the hidden layer 520.

The colorant decision points 500 within the input group 510 may comprise broad colorant classification decision points relating to whether the target coating comprises a solid colorant, an effect pigment, and other similar broad colorant classification. The input group 510 may also comprise colorant decision points relating to whether the target coating is a stain, enamel, latex, or some other class of coating. Additionally, the probabilistic colorant analysis software application 402 may be capable of processing the colorant decision points 500 within the input group 510 in parallel.

The colorant decision points 500 within the input group 510 can be calculated prior to calculating the colorant decision points 500 within the hidden layer 520. For instance, the probabilistic colorant analysis software application 402 may comprise multiple different sets of colorant decision points 500 that reside within the hidden layer. One particular set of colorant decision points 500 may be directed towards identifying the composition of a stain, while another set of colorant decision points 500 may be directed towards identifying a latex coating. As such, the solutions to the colorant decision points 500 within the input group 510 may determine which set of colorant decision points 500 within the hidden layer to use. Using the input group 510 to identify a particular set of colorant decision points 500 to calculate may increase efficiency within the system by, for example, preventing the unnecessary calculation of stain-based colorant decision points 500 when the underlying target coating is a latex coating. In contrast, however, in some cases, every available colorant decision point 500 within the hidden layer can be calculated without regard to the results of the colorant decision points 500 within the input group 510.

Figure 6:
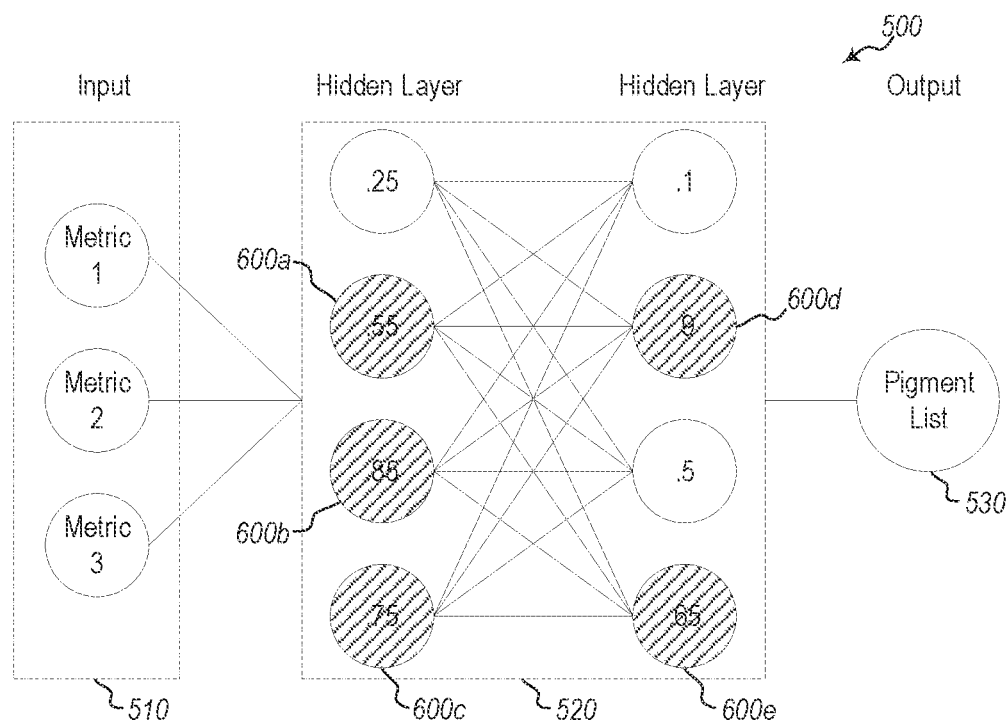
FIG. 6 illustrates a schematic diagram of a probabilistic colorant analysis system in use.

The one or more processors 410(a-c) within the computer system 400 can process the results of the colorant decision points 500 to arrive at a set of final colorant probabilities. For example, FIG. 6 illustrates a schematic diagram of a probabilistic colorant analysis system in use. Similar to the colorant decision points 500 of FIG. 5, FIG. 6 comprises colorant decision points 500 divided into an input group 510, a hidden layer 520, and an output 530.

In FIG. 6 the colorant decision points 500 have been processed and the results are indicated with respect to each of the colorant decision points 500. Once the colorant decision points 500 have been calculated, the decision point manager 450 calculates a set of final colorant probabilities. The set of final colorant probabilities comprise a list of potential colorants that the probabilistic colorant analysis software application 402 identified as potentially being within the target coating 440. Additionally, the set of final colorant probabilities may also comprise a probability associated with each colorant such that the colorant is present within the target coating 440.

Different methods and processes can be used to calculate the set of final colorant probabilities. For example, the probabilistic colorant analysis software application 402 calculates each final colorant probability within the set of final colorant probabilities using a Bayesian analysis. A Bayesian analysis is based on probabilistic reasoning from Bayes' Theorem, which is derived from the conditional probability's definition. Bayes Theorem is reproduced below for reference.

$$P(A\mid B) = \frac{P(B\mid A)P(A)}{P(B)}$$

where: $P(B) \neq 0$

When applying a Bayesian analysis, the probabilistic colorant analysis software application 402 can gather the probabilities that were calculated by each colorant decision point 500 and process them using the Bayes Theorem. In particular, relying upon knowledge (e.g., end-user-supplied) about general colorant attributes that are stored within the computer-readable media 420 (shown in FIG. 4), the probabilistic colorant analysis software application 402 can consider relationships between a unique subset of colorant decision points 500 that indicate specific colorants. For example, computer-storage media 420 may store a database of relationships between unique subsets of colorant decision points 500 and specific colorants. As such, the probabilistic colorant analysis software application 402 can identify different subsets of colorant decision points 500 that have high, combined probabilities and then compare these subsets to data stored in computer-storage media 420. The exemplary lines extending between colorant decision points 500 in FIG. 6 indicate these relationships.

For example, in FIG. 6, the probabilistic colorant analysis software application 402 can identify a unique subset of colorant decision points 600(a-e) as relating to a particular potential colorant. The probabilistic colorant analysis software application 402 calculates a final texture probability that indicates the probability that the particular potential colorant is within the target coating 440. The probabilistic colorant analysis software application 402 can calculate the final texture probability by applying a Bayesian analysis to each of the results of the colorant decision points 600(a-e).

Additionally, the probabilistic colorant analysis software application 402 can apply different weightings to each probability within the unique subset of probabilities calculated by the first set of colorant decision points 500. For example, for a particular potential colorant, the probabilistic colorant analysis software application 402 may weight, within the Bayesian analysis, the results of decision point 600a less than the results of decision point 600d. The various weightings may be stored within the computer-readable media 420 such that the probabilistic colorant analysis software application 402 applies different weightings for each different potential colorant. The different weightings may be based upon previous analysis and knowledge of colorant characteristics. Additionally, the probabilistic colorant analysis software application 402 can actively update the weightings based upon feedback, such as feedback provided by an end-user, that indicates whether the system appropriately selected potential colorants.

Figure 7:
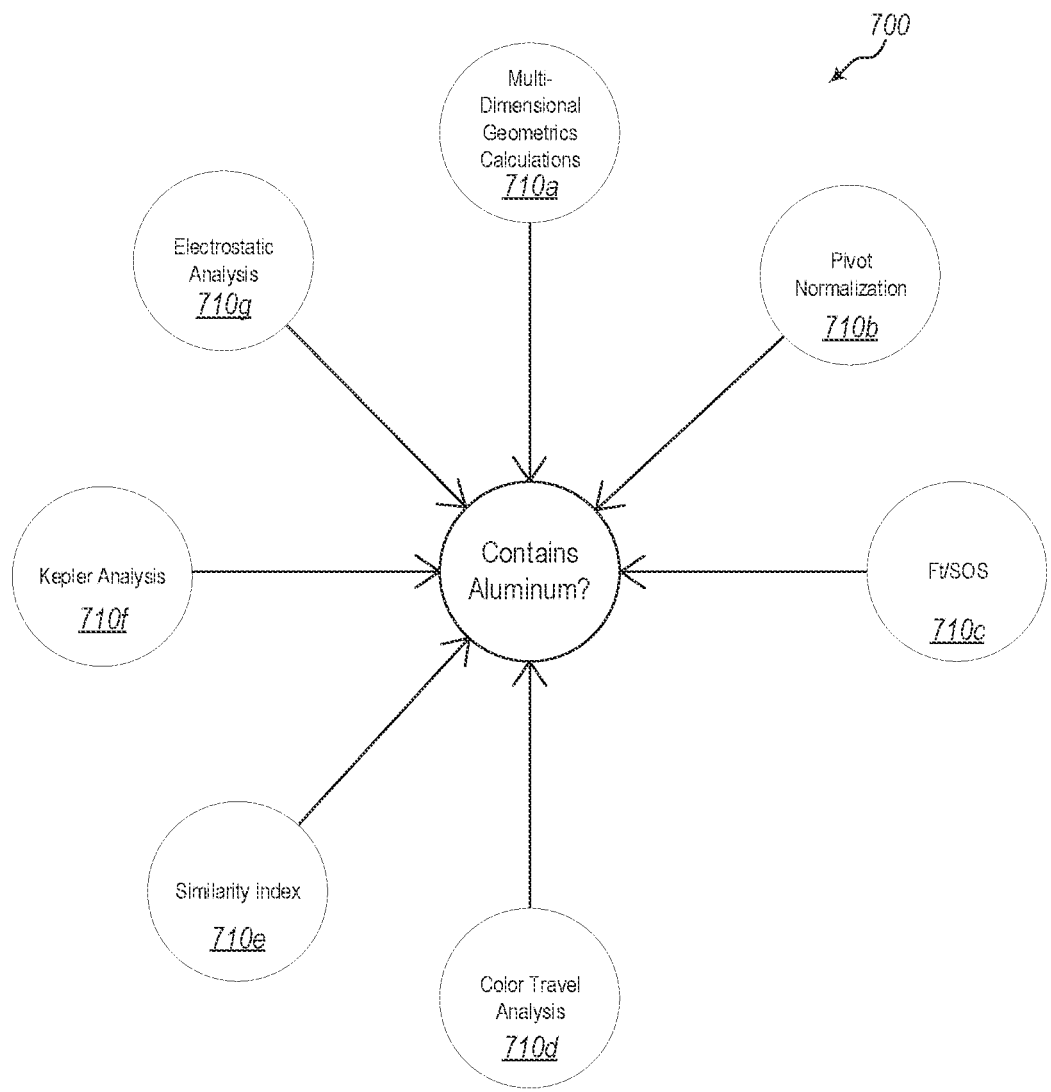
FIG. 7 illustrates a schematic diagram of a colorant decision point within a probabilistic colorant analysis system.

FIG. 7 illustrates a schematic diagram of a particular colorant decision point 700 within a probabilistic colorant analysis system. The depicted particular colorant decision point 700 comprises one or more computer-executable instructions within the application 402, and executes a number of calculations given inputs, such as inputs of spectrometric data, for example, received from a spectrophotometer. For example, the colorant decision point 400 can be configured to provide a probability that the target coating 440 contains an aluminum effect pigment type. Colorant decision points executed in the system 400 may also be directed towards providing probabilities that a target coating (e.g., 440) contains effect pigment types such as an organic/natural mica, specific colored micas, a man-made mica, a colored aluminum, particular colors of aluminum, particular sizes of effect particles, and various other effect pigment types.

FIG. 7 shows that the depicted particular colorant decision point 700 can comprise a set of independent calculations 710(a-g) that can include seven different coating based assessments. For example, independent calculation 710d comprises a calculation relating to the color travel, independent calculation 710f comprises a calculation using Kepler's laws of motion, and calculation 710g comprises a calculation based upon electrostatic characteristics of a target coating 440. While the set of independent calculations 710(a-g) comprises seven specific calculations, the particular colorant decision point 700 may comprise fewer, more, or different independent calculations. For example, the system can be configured to rely primarily on calculations 710a-e for one type of coating, while relying on calculations 710(b-g) for another type of coating and so on.

Each colorant decision point 700 can be directed towards identifying a particular effect pigment type, and each calculation within the set of independent calculations 710(a-g) produces a result that indicates the presence of the particular effect pigment type. The colorant decision point 700 gathers and processes the results of each independent calculation 710(a-g) in order to arrive at a probability that the particular effect pigment type is present within the target coating 440. For example, the colorant decision point 700 may determine that an effect pigment in the form of aluminum flake is present at an 80% probability based on each of the measurements of the target coating 440 for electrostatic analysis 710g, color travel analysis 710d, and Kepler analysis 710f of the received spectrometric data, and with further comparison of the measured/calculated values against those known for other coatings comprising aluminum flake.

When processing the results of the independent calculations, the colorant decision point 400 can calculate a Bayesian probability that the particular effect pigment type is within the target coating 440. For example, the colorant decision point 700 processes results from the independent calculations (generally simultaneously) using a Bayesian analysis in order to produce the probability for the colorant decision point. Additionally, each independent calculation within the set of independent calculations 710(a-g) can be associated with a weighting factor. Because different independent calculations may be more or less accurate, the colorant decision point 700 weights the results of each independent calculation accordingly. Further, the system 400 can normalize the results of each independent calculation so that it reflects a probability that the particular effect pigment type is within the target coating 440.

Accordingly, a first colorant decision point 700 can be directed towards identifying an aluminum effect pigment within a target coating 440. A first set of independent calculations 710(a-g) associated with the first colorant decision point 700 may comprise calculations of the spectrometric data that are specific to providing the independent assessment about the presence of the aluminum effect pigment within the target coating 440.

A second colorant decision point (not shown) can comprise computer-executable instructions used within or in connection with the application 402 and may be directed towards identifying a mica effect pigment within a target coating 440. In order to identify the mica effect pigment, a second set of independent calculations (not shown) may be associated with the second colorant decision point (not shown). The second set of independent calculations may comprise calculations of the spectrometric data that are specific to providing an independent assessment about the presence of the mica effect pigment within the target coating 440. At least a portion of the same independent calculations can be used in both the first colorant decision point 700 and the second colorant decision point. Nevertheless, the system can associate each independent calculation within the first set of independent calculations with a different weighting than the independent calculation within the second set of independent calculations.

Based upon the results of multiple, different colorant decision points (e.g., colorant decision points 500 shown in FIG. 5), the probabilistic colorant analysis software application 402 is able to calculate a set of final colorant probabilities. The set of final colorant probabilities may be a list of all potential effect pigments detected within the target coating 440. Alternatively, the set of final colorants may comprise only a specific portion of the potential colorants within the highest associated probabilities.

FIG. 8 illustrates a table comprising spectrometric data 432 (also shown in FIG. 4) received from a spectrophotometer 430 (shown in FIG. 4) for a particular target coating (e.g., 440). In particular, the depicted spectrometric data 432 comprises reflectance data corresponding to a target coating, the reflectance data being received at the listed wavelengths and angles. Each colorant decision point 500 can receive the entire set of spectrometric data 432. Further, at least a portion of the colorant decision points 500 may also receive input data from other devices. For example, the colorant decision points can receive input data from magnetic sensors, hardness sensors, mass spectrometers, user input, or any other data source. The I/O interface 460 (shown in FIG. 4) feeds the received data to the appropriate colorant decision points. Because the colorant decision points 500 are each independently executable, the decision point manager 450 is able to cause the colorant decision points 500 to be processed in parallel without regard to the input data that each receives.

Figures 9, 10:
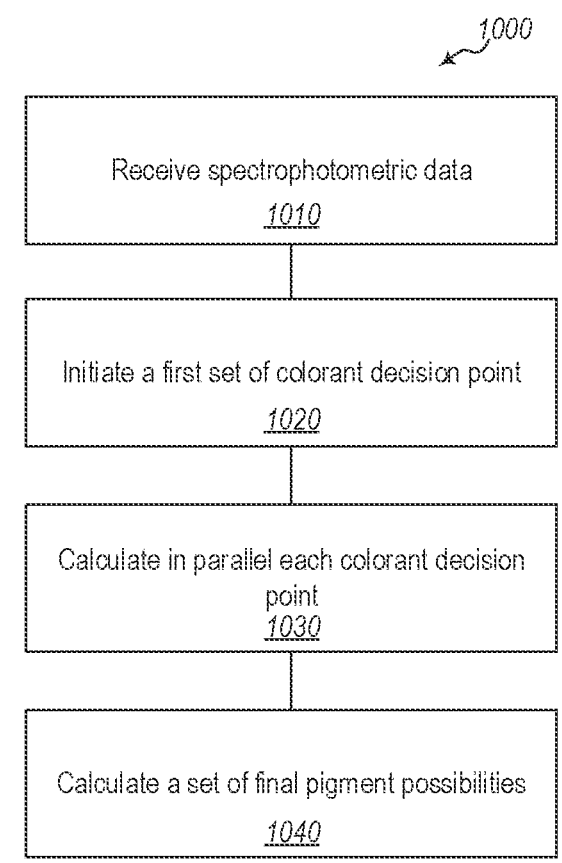
FIG. 9 illustrates a table comprising a set of final colorants and associated final colorant probabilities.
FIG. 10 depicts a flow chart of steps within a method for parallel processing of spectrometric data when identifying coating texture effects.

FIG. 9 illustrates a table comprising a set of final colorants and associated final colorant probabilities 900. In the depicted table, final colorants are represented by letters in the alphabet. In practice, however, one will appreciate that instead of merely listing a letter in the alphabet, the system may list or display the actual potential colorant. In addition to listing the different colorants, the table can also list a probability associated with each colorant.

As depicted, at least a portion of colorants are associated with a zero percent probability of being present within the target coating 440. In contrast, some of the colorants are associated with a one-hundred percent chance of being in the target coating 440. One will appreciate that the depicted probabilities are merely exemplary and that in practice the probabilities would range based upon the results from different subsets of colorant decision points. Additionally, for the sake of example, at least a portion of the colorants are associated with a priority ordering that is based on the colorants' associated probability. As such, the probabilistic colorant analysis software application 402 provides a set of final colorant probabilities that indicate different colorants and respective probabilities that the different colorants are within a target coating 440.

One will appreciate that the disclosed invention can also be described in terms of computerized methods comprising one or more acts for accomplishing a particular result. For example, FIG. 10 and the corresponding text illustrate flowcharts of a sequence of acts in a method for parallel processing of spectrometric data when identifying coating texture effects. The acts of FIG. 10 are described below with reference to the components and modules illustrated in FIGS. 1-9.

For instance, FIG. 10 illustrates that a method 1000 for parallel processing of spectrometric data when identifying coating texture effects comprises an act 1010 of receiving spectrometric data 432. Act 1010 comprises receiving by a computer system, which can be any computer system as defined above, spectrometric data 432 related to a target coating 440. For example, as depicted and described with respect to FIGS. 4 and 8, a spectrophotometer 430 scans a target coating 440. Based upon the scan, the spectrophotometer 430 then sends spectrometric data 432 in the form of reflectance values to the probabilistic colorant analysis software application 402.

FIG. 10 also illustrates that the method 1000 comprises an act 1020 of initiating, by the one or more processors of the computer system, a first set of colorant decision points. Act 1020 includes initiating a first set of colorant decision points. The first set of colorant decision points comprises a first colorant decision point for identifying a probability that a first effect pigment type is present within a target coating and a second colorant decision point for identifying a probability that a second effect pigment type is present within the target coating 440. The first colorant decision point comprises a first set of independent calculations of the spectrometric data 432 that each provide an independent assessment about the presence of the first effect pigment type within the target coating. Similarly, the second colorant decision point comprises a second set of independent calculations of the spectrometric data that each provide an independent assessment about the presence of the second effect pigment type within the target coating 440. Additionally, the first set of independent calculations may be different than the second set of independent calculations.

The act 1020 of initiating a first set of colorant decision points is depicted and described with respect to FIGS. 4, 5, 6, and 7. For example, the decision point manager 450 within the probabilistic colorant analysis software application 402 accesses one or more colorant decision points that are stored within the computer-readable media 420. The decision point manager 450 initiates the first set of colorant decision points by loading the colorant decision points into memory and/or preparing them for processing. Each colorant decision point (e.g., colorant decision point 700 in FIG. 7) comprises a set of independent calculations 710($a$-$g$) that each provide an independent assessment about the presence of a particular effect pigment type within the target coating 440.

Additionally, FIG. 10 illustrates that the method 1000 comprises an act 1030 of calculating in parallel, by the one or more processors of the computer system, each colorant decision point. Act 1030 includes calculating in parallel each colorant decision point within the first set of colorant decision points. Each colorant decision point provides a probability that a different associated effect pigment type is present within the target coating. For example, as depicted and described with respect to FIG. 4, the decision point manager 450 divides the colorant decision points among one or more processors 410($a$-$c$) for processing. The one more processors 410($a$-$c$) may represent different processors accessible through a network connection, different processors within computer system 400, different cores on a silicon die, different virtual processors, or any other processor group capable of multi-threaded processing.

Further, FIG. 10 illustrates that the method 1000 comprises an act 1040 of calculating, by the one or more processors of the computer system, a set of final colorant probabilities. Act 1040 includes calculating a set of final colorant probabilities. Each final colorant probability within the set of final colorant probabilities is calculated by combining a unique subset of probabilities calculated by the first set of colorant decision points. Additionally, each final colorant probability indicates a probability that an associated colorant is present within the target coating. The act 1040 of calculating a set of final colorant probabilities is depicted and described with respect to FIGS. 4, 6, and 9. For example, the probabilistic colorant analysis software application 402 calculates a set of final colorant probabilities 900. At least one final colorant probability for a particular effect pigment is calculated by processing a unique subset of colorant decision points 600(a-e).

Accordingly, FIGS. 1-10 and the corresponding text illustrate or otherwise describe a number of components, schematics, and mechanisms for parallel processing of spectrometric data when identifying coating texture effects. One will appreciate that these components and modules in accordance with implementations of the invention provide fast, flexible, and accurate identification of texture effects within a target coating 440. For example, an end user can scan a target coating 440 with a spectrophotometer 430. In response, a probabilistic colorant analysis software application 402 can process colorant decision points 500 in parallel and produce a set of final colorant probabilities that represent probabilities that particular colorants are present within the target coating 440.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may comprise or utilize a special-purpose or general-purpose computer system that includes computer hardware, such as, for example, one or more processors and system memory, as discussed in greater detail below. The present invention can also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, the present invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud-computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

A cloud-computing environment may comprise a system that includes one or more hosts that are each capable of running one or more virtual machines. During operation, virtual machines emulate an operational computing system, supporting an operating system and perhaps one or more other applications as well. Each host may include a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

In view of the foregoing the present invention relates for example, without being limited thereto, to the following aspects:

1. A computerized method for parallel processing of spectrometric data in coating analysis making use of a computer system comprising one or more processors and one or more computer-readable media having stored thereon executable instructions that when executed by the one or more processors configure the computer system to perform in accordance with the method, the method comprising:
  receiving by the computer system spectrometric data related to a target coating;
  initiating, by the one or more processors, a first set of colorant decision points, wherein the first set of colorant decision points comprises:
    a first colorant decision point for identifying a probability that a first effect pigment type is present within the target coating, the first colorant decision point comprising a first set of independent calculations of the spectrometric data that each provide an independent assessment about the presence of the first effect pigment type within the target coating, and
    a second colorant decision point for identifying a probability that a second effect pigment type is present within the target coating, the second colorant decision point comprising a second set of independent calculations of the spectrometric data that each provide an independent assessment about the presence of the second effect pigment type within the target coating,
    wherein the first set of independent calculations are different than the second set of independent calculations;
  calculating in parallel, by the one or more processors, each colorant decision point within the first set of colorant decision points, wherein each colorant decision point provides a probability that an associated effect pigment type is present within the target coating; and
  calculating, by the one or more processors, a set of final colorant probabilities, wherein each final colorant probability within the set of final colorant probabilities is calculated by combining a unique subset of probabilities calculated by the first set of colorant decision points,
  wherein each final colorant probability indicates a probability that an associated colorant is present within the target coating.

2. The method according to preceding Aspect 1, wherein:
  the first effect pigment type comprises an aluminum effect pigment; and
  the first set of independent calculations of the spectrometric data are specific to providing an independent assessment about the presence of the aluminum effect pigment within the target coating.

3. The method according to any one of Aspects 1 or 2, wherein
  the second effect pigment type comprises a mica effect pigment; and
  the second set of independent calculations of the spectrometric data are specific to providing an independent assessment about the presence of the mica effect pigment within the target coating.

4. The method according to any one of preceding Aspects 1 to 3, wherein calculating in parallel each colorant decision point within the first set of colorant decision points comprises initiating, by the one or more processors, a calculation of the first set of independent calculations and the second set of independent calculations within parallel threads.

5. The method according to any one of preceding Aspects 1 to 4, further comprising:
  Initiating, by the one or more processors, a second set of colorant decision points, wherein the second set of colorant decision points are different than the first set of colorant decision points; and
  Calculating, by the one or more processors, the second set of colorant decision points prior to calculating the first set of colorant decision points.

6. The method according to any one of preceding Aspects 1 to 5, wherein the first set of independent calculations comprises:
  a calculation relating to the color travel; and
  a calculation based upon an electrostatic analysis of the target coating.

7. The method according to any one of preceding Aspects 1 to 6, wherein each calculation within the first set of independent calculations is associated with a different weighting when calculating a first decision point probability that a particular effect pigment type is present within the target coating.

8. The method according to any one of preceding Aspects 1 to 7, wherein calculating the set of final colorant probabilities comprises:
  applying different weightings to each probability within the unique subset of probabilities calculated by the first set of colorant decision points.

9. The method according to any one of preceding Aspects 1 to 8, wherein each final colorant probability within the set of final colorant probabilities is calculated using a Bayesian analysis.

10. The method according to any one of preceding Aspects 1 to 9, wherein the spectrometric data related to the target coating are received from a spectrophotometer in communication with the computer system.

11. The method according to any one of preceding Aspects 1 to 10, further comprising adding, by the one or more processors, one or more colorants to a formulation engine, wherein the colorants are added to the formulation engine in an order of decreasing calculated final colorant probability; and generating, by the one or more processors, through the formulation engine, a coating formulation that is calculated to match the target coating within a predetermined qualitative or quantitative threshold.

12. The method according to Aspect 11, further comprising transferring the generated coating formulation to a paint mixing system in communication with the computer system and producing a corresponding coating formulation by the paint mixing system.

13. A computerized system, useful for example for practicing the method according to any one of the preceding Aspects 1 to 12, the system comprising:

a computer system comprising one or more processors and one or more computer-storage media having stored thereon executable instructions that when executed by the one or more processors configure the computer system to perform at least the following:

receive spectrometric data related to a target coating;

initiate a first set of colorant decision points, wherein the first set of colorant decision points comprises:

a first colorant decision point for identifying a probability that a first effect pigment type is present within the target coating, the first colorant decision point comprising a first set of independent calculations of the spectrometric data that each provide an independent assessment about the presence of the first effect pigment type within the target coating, and a second colorant decision point for identifying a probability that a second effect pigment type is present within the target coating, the second colorant decision point comprising a second set of independent calculations of the spectrometric data that each provide an independent assessment about the presence of the second effect pigment type within the target coating, wherein the first set of independent calculations are different than the second set of independent calculations;

calculate in parallel each colorant decision point within the first set of colorant decision points, wherein each colorant decision point provides a probability that an associated effect pigment type is present within the target coating; and calculate a set of final colorant probabilities, wherein each final colorant probability within the set of final colorant probabilities is calculated by combining a unique subset of probabilities calculated by the first set of colorant decision points, wherein each final colorant probability indicates a probability that an associated colorant is present within the target coating.

14. The computerized system according to preceding Aspect 13, wherein:

the first effect pigment type comprises an aluminum effect pigment; and the first set of independent calculations of the spectrometric data are specific to providing an independent assessment about the presence of the aluminum effect pigment within the target coating.

15. The computerized system according to any one of preceding Aspects 13 or 2, wherein the second effect pigment type comprises a mica effect pigment; and the second set of independent calculations of the spectrometric data are specific to providing an independent assessment about the presence of the mica effect pigment within the target coating.

16. The computerized system according to any one of preceding Aspects 13 to 15, wherein calculating in parallel each colorant decision point within the first set of colorant decision points comprises initiating a calculation of the first set of independent calculations and the second set of independent calculations within parallel threads.

17. The computerized system according to any one of preceding Aspects 13 to 16, wherein the executable instructions further include instructions that are executable to configure the computer system to:

initiate a second set of colorant decision points, wherein the second set of colorant decision points are different than the first set of colorant decision points; and calculate the second set of colorant decision points prior to calculating the first set of colorant decision points.

18. The computerized system according to any one of preceding Aspects 13 to 17, wherein the first set of independent calculations comprises:

a calculation relating to the color travel; and a calculation based upon an electrostatic analysis of the target coating.

19. The computerized system according to any one of preceding Aspects 13 to 18, wherein each calculation within the first set of independent calculations is associated with a different weighting when calculating a first decision point probability that a particular effect pigment type is present within the target coating.

20. The computerized system according to any one of preceding Aspects 13 to 19, wherein calculating a set of final colorant probabilities comprises:

applying different weightings to each probability within the unique subset of probabilities calculated by the first set of colorant decision points.

21. The computerized system according to any one of preceding Aspects 13 to 20, wherein each final colorant probability within the set of final colorant probabilities is calculated using a Bayesian analysis.

22. The computerized system according to any one of preceding Aspects 13 to 21, wherein calculating in parallel each colorant decision point within the first set of colorant decision points, comprises calculating a Bayesian probability for each colorant decision point.

23. The computerized system according to any one of preceding Aspects 13 to 22, further comprising a spectrophotometer in communication with the computer system for measuring spectrometric data of the target coating.

24. The computerized system according to any one of preceding Aspects 13 to 23, wherein the executable instructions further include instructions that are executable to configure the computer system to:

add one or more colorants to a formulation engine, wherein the colorants are added to the formulation engine in an order of decreasing calculated final colorant probability; and generate, by the one or more processors, through the formulation engine, a coating formulation that is calculated to match the target coating within a predetermined qualitative or quantitative threshold.

25. The computerized system according to any one of preceding Aspects 13 to 24, further comprising a paint mixing system in communication with the computer system for production of the generated coating formulation.

26. A computer program product comprising one or more computer-readable storage media having stored thereon computer-executable instructions that, when executed at a processor, cause a computer system, such as a computer system being part of a computerized system as defined in any one of preceding Aspects 13 to 25, to perform a method for parallel processing of spectrometric data in coating analysis as defined in any one of preceding Aspects 1 to 12.

The present invention may be embodied in other specific forms without departing from its spirit or essential characteristics. The described preset invention is to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A computer system for parallel processing of spectrometric data when identifying coating texture effects, comprising:
    one or more processors; and
    one or more computer-storage media having stored thereon executable instructions that when executed by the one or more processors configure the computer system to perform at least the following:
    receive spectrometric data from a target coating;
    initiate a first set of colorant decision points, wherein the first set of colorant decision points comprises:
    a first colorant decision point for identifying a probability that a first effect pigment type is present within a target coating, the first colorant decision point comprising a first set of independent calculations of the spectrometric data that each provide an independent assessment about the presence of the first effect pigment type within the target coating, and
    a second colorant decision point for identifying a probability that a second effect pigment type is present within the target coating, the second colorant decision point comprising a second set of independent calculations of the spectrometric data that each provide an independent assessment about the presence of the second effect pigment type within the target coating,
    wherein the first set of independent calculations are different than the second set of independent calculations;
    calculate in parallel each colorant decision point within the first set of colorant decision points, wherein each colorant decision point provides a probability that a different effect pigment type is present within the target coating; and
    calculate a set of final colorant probabilities, wherein each final colorant probability within the set of final colorant probabilities is calculated by combining a unique subset of probabilities calculated by the first set of colorant decision points,
    wherein each final colorant probability indicates a probability that an associated colorant is present within the target coating.

2. The computer system of claim 1, wherein:
    the first effect pigment type comprises an aluminum effect pigment; and
    the first set of independent calculations of the spectrometric data are specific to providing the independent assessment about the presence of the aluminum effect pigment within the target coating.

3. The computer system of claim 2, wherein
    the second effect pigment type comprises a mica effect pigment; and
    the second set of independent calculations of the spectrometric data are specific to providing the independent assessment about the presence of the mica effect pigment within the target coating.

4. The computer system of claim 1, wherein calculating in parallel each colorant decision point within the first set of colorant decision points comprises initiating a calculation of the first set of independent calculations and the second set of independent calculations within parallel threads.

5. The computer system of claim 1, wherein the executable instructions include instructions that are executable to configure the computer system to:
    initiate a second set of colorant decision points, wherein the second set of colorant decision points are different than the first set of colorant decision points; and
    calculate the second set of colorant decision points prior to calculating the first set of colorant decision points.

6. The computer system of claim 1, wherein the first set of independent calculations comprise:
    a calculation relating to a color travel; and
    a calculation based upon an electrostatic analysis of the target coating.

7. The computer system of claim 1, wherein each calculation within the first set of independent calculations is associated with a different weighting when calculating a first decision point probability that a particular effect pigment type is present within the target coating.

8. The computer system of claim 1, wherein calculating a set of final colorant probabilities comprises:
    applying different weightings to each probability within the unique subset of probabilities calculated by the first set of colorant decision points.

9. The computer system of claim 8, wherein each final colorant probability within the set of final colorant probabilities is calculated using a Bayesian analysis.

10. The computer system of claim 1, wherein calculating in parallel each colorant decision point within the first set of colorant decision points, comprises calculating a Bayesian probability for each colorant decision point.

11. A method for parallel processing of spectrometric data when identifying coating texture effects, the method executed using one or more processors from instructions that are stored on one or more computer-storage media, the method comprising:
    receiving spectrometric data from a target coating;
    initiating a first set of colorant decision points, wherein the first set of colorant decision points comprises:
    a first colorant decision point for identifying a probability that a first effect pigment type is present within a target coating, the first colorant decision point comprising a first set of independent calculations of the spectrometric data that each provide an independent assessment about the presence of the first effect pigment type within the target coating, and
    a second colorant decision point for identifying a probability that a second effect pigment type is present within the target coating, the second colorant decision point comprising a second set of independent calculations of the spectrometric data that each provide an independent assessment about the presence of the second effect pigment type within the target coating, wherein the first set of independent calculations are different than the second set of independent calculations;

calculating in parallel each colorant decision point within the first set of colorant decision points, wherein each colorant decision point provides a probability that a different effect pigment type is present within the target coating; and calculating a set of final colorant probabilities, wherein each final colorant probability within the set of final colorant probabilities is calculated by combining a unique subset of probabilities calculated by the first set of colorant decision points, wherein each final colorant probability indicates a probability that an associated colorant is present within the target coating.

12. The method of claim 11, wherein:

the first effect pigment type comprises an aluminum effect pigment; and the first set of independent calculations of the spectrometric data are specific to providing the independent assessment about the presence of the aluminum effect pigment within the target coating.

13. The method of claim 12, wherein the second effect pigment type comprises a mica effect pigment; and the second set of independent calculations of the spectrometric data are specific to providing the independent assessment about the presence of the mica effect pigment within the target coating.

14. The method of claim 11, wherein calculating in parallel each colorant decision point within the first set of colorant decision points comprises initiating a calculation of the first set of independent calculations and the second set of independent calculations within parallel threads.

15. The method of claim 11, further comprising:

initiating a second set of colorant decision points, wherein the second set of colorant decision points are different than the first set of colorant decision points; and calculating the second set of colorant decision points prior to calculating the first set of colorant decision points.

16. The method of claim 11, wherein the first set of independent calculations comprises:

a calculation relating to the color travel; and a calculation based upon an electrostatic analysis of the target coating.

17. The method of claim 11, wherein each calculation within the first set of independent calculations is associated with a different weighting when calculating a first decision point probability that a particular effect pigment type is present within the target coating.

18. The method of claim 11, wherein calculating a set of final colorant probabilities comprises:

applying different weightings to each probability within the unique subset of probabilities calculated by the first set of colorant decision points.

19. The method of claim 18, wherein each final colorant probability within the set of final colorant probabilities is calculated using a Bayesian analysis.

20. A computer program product comprising one or more non-transitory computer storage media having stored thereon computer-executable instructions that, when executed at a processor, cause a computer system to perform a method for parallel processing of spectrometric data when identifying coating texture effects, the method comprising:

receiving spectrometric data from a target coating;

initiating a first set of colorant decision points, wherein the first set of colorant decision points comprises:

a first colorant decision point for identifying a probability that a first effect pigment type is present within a target coating, the first colorant decision point comprising a first set of independent calculations of the spectrometric data that each provide an independent assessment about the presence of the first effect pigment type within the target coating, and a second colorant decision point for identifying a probability that a second effect pigment type is present within the target coating, the second colorant decision point comprising a second set of independent calculations of the spectrometric data that each provide an independent assessment about the presence of the second effect pigment type within the target coating, wherein the first set of independent calculations are different than the second set of independent calculations;

calculating in parallel each colorant decision point within the first set of colorant decision points, wherein each colorant decision point provides a probability that a different effect pigment type is present within the target coating; and calculating a set of final colorant probabilities, wherein each final colorant probability within the set of final colorant probabilities is calculated by combining a unique subset of probabilities calculated by the first set of colorant decision points, wherein each final colorant probability indicates a probability that an associated colorant is present within the target coating.

* * * * *